(12) United States Patent
Rivers et al.

(10) Patent No.: US 10,341,326 B2
(45) Date of Patent: Jul. 2, 2019

(54) NETWORK SECURITY FOR ENCRYPTED CHANNEL BASED ON REPUTATION

(71) Applicant: Trend Micro Incorporated, Tokyo (JP)

(72) Inventors: Scott Rivers, Austin, TX (US); Matthew Laswell, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 236 days.

(21) Appl. No.: 15/255,718

(22) Filed: Sep. 2, 2016

(65) Prior Publication Data

US 2016/0373433 A1     Dec. 22, 2016

Related U.S. Application Data

(63) Continuation of application No. PCT/US2014/021526, filed on Mar. 7, 2014.

(51) Int. Cl.
*H04L 9/32* (2006.01)
*H04L 29/06* (2006.01)

(52) U.S. Cl.
CPC ........ *H04L 63/0823* (2013.01); *H04L 9/3265* (2013.01); *H04L 63/101* (2013.01)

(58) Field of Classification Search
USPC ....................................................... 713/156
See application file for complete search history.

(56) References Cited

U.S. PATENT DOCUMENTS

| | | | |
|---|---|---|---|
| 2005/0132060 A1* | 6/2005 | Mo | H04L 51/12 709/227 |
| 2008/0005223 A1 | 1/2008 | Flake et al. | |
| 2008/0028443 A1 | 1/2008 | Adelman et al. | |
| 2012/0096516 A1 | 4/2012 | Sobel et al. | |
| 2013/0081129 A1 | 3/2013 | Niemela | |
| 2013/0263273 A1 | 10/2013 | Ramcharran | |
| 2015/0134967 A1* | 5/2015 | Moore | H04L 9/3263 713/175 |

* cited by examiner

*Primary Examiner* — Kambiz Zand
*Assistant Examiner* — Aubrey H Wyszynski
(74) *Attorney, Agent, or Firm* — Okamoto & Benedicto LLP

(57) ABSTRACT

Example embodiments disclosed herein relate to providing network security. A network security device parses an initial handshake or communication to establish an encrypted channel between two endpoints. The network security device validates a certificate chain between the two endpoints and determines a reputation for each of one or more signers of a respective one or more certificates of the certificate chain. The network security device determines a certificate reputation for the certificate chain.

14 Claims, 3 Drawing Sheets

US 10,341,326 B2

NETWORK SECURITY FOR ENCRYPTED CHANNEL BASED ON REPUTATION

CROSS-REFERENCE TO RELATED APPLICATION

This application is a continuation of International Application No. PCT/US2014/021526, with an International Filing Date of Mar. 7, 2014, which is incorporated herein by reference in its entirety.

BACKGROUND

Security providers and manufacturers are challenged to deliver quality and value to consumers, for example, by providing a secure networking environment. Packet inspection devices can be deployed in a network to inspect content of data packets communicated through the network. When used to apply network security, packet inspection technology is employed at multiple protocol layers to identify suspicious or malicious packets.

BRIEF DESCRIPTION OF THE DRAWINGS

The following detailed description references the drawings, wherein.

DETAILED DESCRIPTION

Figures 1, 2:
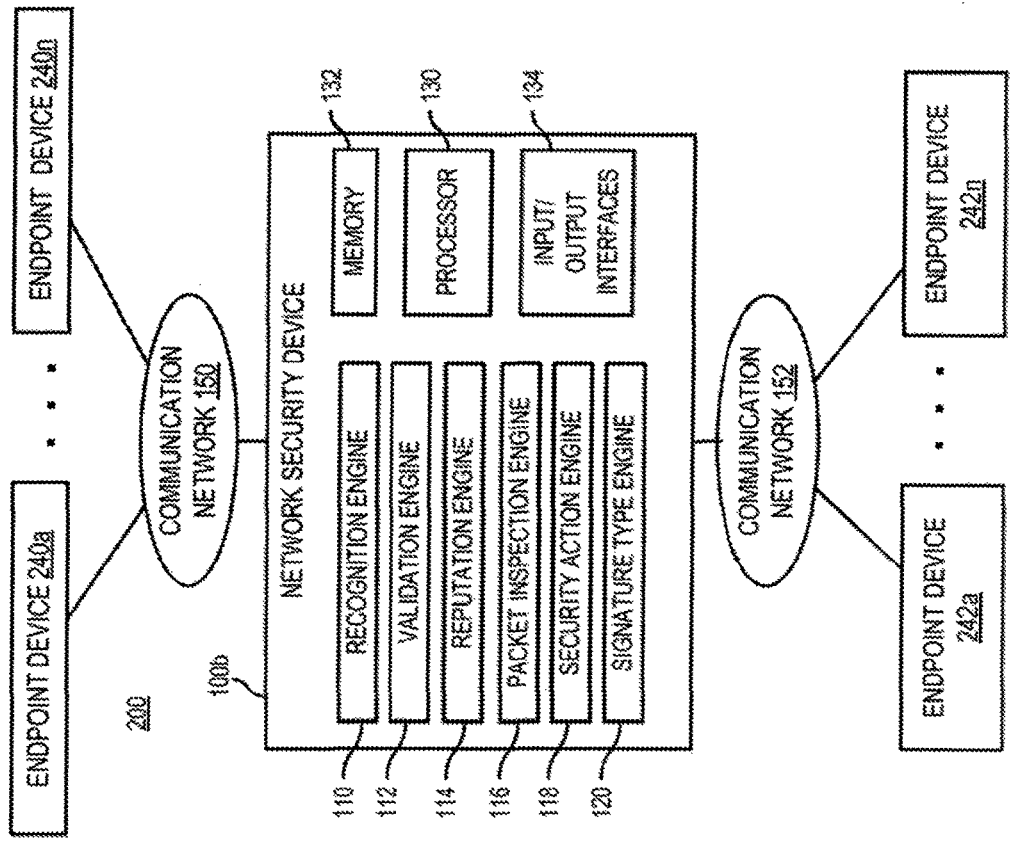
FIG. 1 is a block diagram of a network security device for identifying encrypted communication based on signers of the encrypted communication, according to one example.
FIG. 2 is a block diagrams of a computing system capable of performing a security action on identified encrypted communication based on reputation of certificate signers, according to various examples.

Technologies can be used to protect an entity such as an individual, enterprise, etc. from unwanted malicious activity. Intrusion prevention devices can be network security appliances that can be used to monitor network and/or system activities for malicious activity. Network security devices face challenges to detect attacks in traffic from a wide variety of applications, file types, protocols, and services. Some of these attacks may use encryption directly or indirectly.

The growing use of encryption presents a problem for network security devices. More and more web traffic is encrypted, which makes it difficult for devices such as firewalls and intrusion prevention systems (IPSs) to inspect the traffic coming into protected networks for malware. Similarly, once a computing device is infected with malware, it may reach out to a command and control (C&C) network for instructions, as well as to do things like data exfiltration. These channels can be encrypted as well.

For example, if a client in the networking environment is infected with malware, the malware may reach out to a C&C network for instructions. This channel may be encrypted to prevent a network security appliance from preventing the communication.

A problem for security devices is that modern cryptographic protocols, such as Secure Sockets Layer (SSL) and Transport Layer Security (TLS), are designed to prevent a so-called "man in the middle" from being able to read the encrypted text. However, that is precisely what network security devices do if the network security devices are to fulfill their mission of protecting networks and data.

Accordingly, various embodiments disclosed herein relate to a network security device that can leverage reputational information about the certificates used for authentication during the initiation of an encrypted channel. The information is used to detect and block channels which are likely to be used to attack the network, such as malware downloads or encrypted command and control networks.

During initiation of an encrypted channel, the network security device can recognize and parse the initial handshake between the endpoints (e.g., computing devices using the channel). The network security device can validate any certificates used between the endpoints. Reputations or other scores representing the likelihood that the certificate is trustworthy can be determined for the certificates. Further, the certificates can be signed by signers. The signers can be associated with reputations. The reputation of the respective signers of certificates used can be used to determine a reputation of the certificates and/or for the chain of certificates between the endpoints. The reputation of the entire chain can be used to determine whether the encrypted communication between the endpoints is allowed. In some examples, packets can be blocked by the network security device to stop the encrypted communication.

As noted, multiple certificates can be used to certify Certificate Authority (CA) to a root CA certificate. In some examples, a certificate chain is a list of certificates to authenticate an entity. The chain or path begins with a certificate to the entity and each certificate in the chain is signed by the entity identified by the next certificate in the chain. The chain ends with a root CA certificate. The root CA certificate is signed by the certificate authority. Signatures of each of the certificates in the chain are verified until the root CA certificate is reached. Further, reputations for each of the signers of the certificates in the chain can be checked to determine whether the signers are associated with malware or other unwanted network behavior. Moreover, the reputation of the respective certificates can be based on the reputation of the signer of the certificates and/or based on a heuristic analysis. Malware is referred to in many parts of this disclosure. It should be understood that other types of unwanted network behavior (e.g., data leakage) can be implicated when the term malware is used.

Packet inspection can involve examining the content of a packet or stream of packets, where the examined content includes the payload of the packet, and possibly the header of the packet. A "packet" can refer to any type of data unit that is used for carrying data between electronic devices. As examples, a packet can include an IP packet, an Ethernet frame, or any other type of data unit. Further, inspection of a packet may be part of a greater inspection of a stream of packets that the packet is associated with. Moreover, a packet stream may include one or more packets.

Examining the content of a packet can be performed for various purposes, including security purposes (e.g. to identify or block unauthorized intrusion, to detect or block malware such as a virus or worm, to detect or block spam, to detect protocol non-compliance, to control an application, and so forth). Packet inspection can be used to determine when two endpoints are initiating an encrypted channel.

Reputation information about endpoints and/or signers of certificates can include metadata about the endpoint (e.g., is it a source of junk emails? Malware? Is it part of a botnet?, etc.) and/or a reputation score, which indicates the overall reputation of the endpoint, signer, etc. (e.g., 0=perfectly good, 100=source of much malware). Various approaches, such as scores, or classifications (e.g., bad (source of malware), medium (may be source of malware), unknown (no known reputation for having malware), good (known good or whitelisted)), can be used to implement the reputation. When the network security device inspects a flow of traffic, it can determine that an encrypted channel is being set up using known protocols. For example, the network security device can look for indications that a SSL/TSL handshake protocol is being implemented (e.g., via hashes and/or patterns). When this occurs, the network security device can parse out the unencrypted communications to determine what certificates are being used and what is being used to sign the certificates (e.g., during a key exchange).

FIG. 1 is a block diagram of a network security device for identifying encrypted communication based on signers of the encrypted communication, according to one example. FIG. 2 is a block diagrams of a computing system capable of performing a security action on identified encrypted communication based on reputation of certificate signers, according to various examples. Network security devices 100a, 100b include components that can be utilized to identify encrypted communication based on reputation of signers of the encrypted communication. A security action can then be performed on the encrypted communication. The respective network security devices 100a, 100b may be a computer, a server, an intrusion prevention system, an intrusion detection system, a router, a firewall, or any other computing device or system (e.g., a disaggregated system) that is capable of performing the functionality described herein.

In certain examples, the network security device 100a can include a recognition engine 110, a validation engine 112, and a reputation engine 114. In other examples, the network security device 100b can be part of a system 200 and include a recognition engine 110, a validation engine 112, a reputation engine 114, a packet inspection engine 116, a security action engine 118, a signature type engine 120, one or more processors 130, memory 132, input/output interface 134, and the like. In certain examples, as shown in FIG. 2, the network security device 100b is an inline device between an endpoint devices 240a-240n and endpoint devices 242a-242n. Multiple network security devices can be part of a network security system between a set of endpoints within a networking environment and other endpoints. In some examples, the endpoint devices 242 can be considered one or more devices that the network security device 100b protects. The engines include hardware and/or combinations of hardware and programming to perform functions provided herein. Moreover, the modules (not shown) can include programming functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine in certain circumstances.

A recognition engine 110 can be used to recognize and parse an initial handshake used to establish an encrypted channel between two endpoints (e.g., endpoints 240 and 242. A packet inspection engine 116 can be used to inspect packets communicated by the endpoints. The rules for inspected packets can be set such that when particular traffic (e.g., based on headers, patterns of packets, etc.) passes through that reflects a handshake between known protocols (e.g., a SSL or TLS protocol), the recognition engine 110 recognizes the handshake. Even though SSL/TLS protocols are pointed out, other cryptographic protocols that use certificates to authenticate the endpoints can be used.

The validation engine 112 validates a certificate chain between the two endpoints when the recognition engine 110 detects a handshake. The network security device 100, is able to find, parse and validate the contents of the certificates being used to authenticate the client and server endpoints 240, 242 that are attempting to establish a connection. For each certificate, it can determine who allegedly signed it (the issuer), and who they signed it for (the subject). The validation engine 112 can also validate that the signer is the one who really signed the certificate by verifying that the alleged signer's public key can be used to successfully decrypt a portion of the certificate.

The network security device 100 looks at the complete chain of certificates that are used to establish trust between the endpoints 240, 242, determining at each link the reputation of the signer of the link. In certain examples, this will result in one of three results at each step: The certificate is self-signed by its issuer (e.g. the issuer and subject are the same); the certificate is signed by someone other than the issuer; or regardless of who the certificate claims the signer is, it cannot be validated (e.g. the public key of the alleged signer cannot actually decrypt the contents).

The reputation engine 114 can determine a respective reputation for certificates in the certificate chain. This reputation can represent a trustworthiness of the certificate. The reputation of the individual certificates can be based on the reputation of the signer of the certificate, an analysis of one or more parameters or attributes of the certificate (e.g., a serial number, a version number, a hash, a key length, a date, a timestamp, etc.), combinations thereof, etc. In certain examples, a combination of parameters/attributes can lead to the determination that a certificate is not trustworthy. This can be based on a pattern or rule.

The network security device 100 has the ability to ingest and use a feed of reputation data that provides information about the certificate signers. This feed can include a whitelist of trusted certificate authorities which are known to be trustworthy. The feed can also include a list of other certificate signers, with an associated reputation score for each one. The reputations can be in the form of scores. These scores can be feeds used in existing Internet Protocol (IP) and Domain Name System (DNS) reputation feeds that confidence that the certificate is associated with hostile traffic. In one example, a score of 100 is a signer whose certificates are seen commonly and are always associated with malware, command and control, or other undesirable traffic. A score of 0 is a signer whose certificates are seen commonly and are never associated with any bad traffic. Scores in between can be for signers that are not well known or whose traffic is only sometimes associated with attack traffic. These number scores are just examples and various thresholds and other data structures can be used to convey and structure the same or similar information. In some examples, the feed may also include constants used by algorithms that determine the likelihood that a self-signed certificate was generated by a hostile site as further described below and additional parameters that can be used to perform meta-analysis of certificates in order to augment the reputation approach.

The feed can be generated by a security service. The service can perform a constant study of samples of malware and of network traffic and is distributed as a frequently-updated package, much as what currently done for IP address and DNS name reputation feeds. Entities protected can also add their own data to the feed, for example to whitelist self-signed internal applications.

In certain examples, the reputations can be based on at least one of the information provided in the feed, for example, a whitelist and a reputation feed. If the certificate can be validated and was signed by a certificate authority on the whitelist, it is deemed to have good reputation (e.g., a 0 reputation in the example above). Similarly, in one example, if the certificate cannot be validated, its reputation is deemed to be poor reputation (e.g., a 100 reputation in the example above) or not permissible.

In another example, if the certificate can be validated and it is not self-signed, the network security device can assign the reputation value of the signing entity as contained in the reputation feed to the certificate. In yet another example, if the signer of a certificate is not on the whitelist or the reputation feed, the reputation is set to a predetermined level indicating that the reputation is permissible. In one example, the reputation can be treated as a baseline. The baseline can be set between 0 and 100 in the example above (e.g., 50). In the future reputation in the feed can be updated based on how it behaves.

Further, in some examples, the reputation of one of the certificates is based on a reputation feed and a meta-analysis of the certificate. In these examples, the certificate reputation can be modified according to meta-analysis using rules contained in the reputation feed. This analysis allows the deep packet inspection engine 116 to assign reputational value to patterns seen in the certificate. For example, the rules could tell the engine to lower the reputation of certificates that are less than four hours old, or ones that have addresses (e.g., IP addresses and/or physical addresses) in untrusted countries. Similarly, very old certificates could be set to poor reputation scores always.

Further, in another example, if the certificate is self-signed, the signing domain will be passed through algorithms designed to detect the probability that its name came from a natural language, or was instead generated randomly by a computer (e.g., a machine generated name). In such a case the reputation score will be the inverse of this probability (e.g. if it's likely that the domain name is from a human language, the reputation score will be good (e.g., 0), if it's likely that the domain name was randomly generated the reputation score will be poor (e.g., 100)). Other validation steps on a self-signed certificate are possible here as well (e.g., the network security device 100 could study the address of the certificate signer to look for anomalies, or even make maps application queries to determine if the address is real). The entity being protected can also choose to simply not allow self-signed certificates, effectively giving them a poor reputation score. Moreover, the certificate need not be self-signed to use such an algorithm to determine a reputation for the certificate.

In some examples, a signature type engine 120 can be used to determine whether the certificate chain is self-signed by one of the endpoints 240, 242. In the case where the respective signer of one of the certificates is the endpoint (self-signed), if the certificate chain is self-signed, one of the algorithms can be used. Thus, if the certificate chain is self-signed, the network security device 100 can perform analysis to determine whether the certificate is abnormal and/or carries an indicator that illegitimate certificate is in use. As such, if the domain name of the endpoint is a natural language domain, the reputation for the signer can be set to a predetermined level indicating that the reputation is permissible (e.g., 40). Further, if the respective domain is not a natural language domain, the respective reputation for the signer is set to another predetermined level indicating that the reputation is not permissible (e.g., 100).

In some examples, the reputation engine 114 is further to determine a certificate reputation for the certificate chain. The certificate reputation can be based on an average value of the respective reputations and a value of the worst one of the respective reputations. In certain examples, the certificate reputation for the certificate chain can be based on combining the reputation of many certificates in a chain into a single aggregate data structure (e.g., a score or set of values) that reflects the trustworthiness of the entire chain.

In one example, the reputation engine 114 can generate two statistics from the set of reputations associated with the chain. The numerically highest reputation score in the list (e.g. the worst reputation) and the average of all the reputation scores in the list. In one example, the average can be a mean average. In another example, the average can be a median average. Other statistical algorithms can also be used other than average.

The values can be combined into a single score—the certificate reputation. The certificate reputation may be compared to a user-configurable policy (e.g., based on a single combined score value, an algorithm using the highest reputation score and the average, etc.) and a security action engine 118 can at that point take a user-defined action. In one example, the actions available can be to let the connection continue or to block it. In another example, blocking a connection can also result in a user-notification. Possible actions can also be more complex, for example, the actions can include gathering additional statistics, attempting a man in the middle attack on the connection, or other choices. In certain examples, the encrypted channel can be blocked, one or more packets can be blocked, and/or a stream of packets can be blocked.

A processor 130, such as a central processing unit (CPU) or a microprocessor suitable for retrieval and execution of instructions and/or electronic circuits can be configured to perform the functionality of any of the engines described herein. In certain scenarios, instructions and/or other information, such as reputation information, can be included in memory 132 or other memory. Input/output interfaces 134 may additionally be provided by the network security device 100b. For example, input devices, such as a keyboard, a sensor, a touch interface, a mouse, a microphone, etc. can be utilized to receive input from an environment surrounding the network security device 100b. Further, an output device such as a display, can be utilized to present information to users. Examples of output devices include speakers, display devices, amplifiers, etc. Moreover, in certain embodiments, some components can be utilized to implement functionality of other components described herein. Input/output devices such as communication devices like network communication devices or wireless devices can also be considered devices capable of using the input/output interfaces 134.

Each of various modules corresponding to the engines (not shown) may include, for example, hardware devices including electronic circuitry for implementing the functionality described herein. In addition or as an alternative, each module/engine may be implemented as a series of instructions encoded on a machine-readable storage medium of network security device 100 and executable by processor 130. It should be noted that, in some embodiments, some modules are implemented as hardware devices, while other modules are implemented as executable instructions.

The communication networks 250, 252 can use wired communications, wireless communications, or combinations thereof. Further, the communication networks 250, 252 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication networks 250, 252 can be in the form of a direct network link between devices. Various communications structures and infrastructure can be utilized to implement the communication network(s).

By way of example, the devices communicate with each other and other components with access to one or more communication networks via a communication protocol or multiple protocols. A protocol can be a set of rules that defines how nodes of the communication networks interact with other nodes. Further, communications between network nodes can be implemented by exchanging discrete packets of data or sending messages. Packets can include header information associated with a protocol (e.g., information on the location of the network node(s) to contact) as well as payload information.

The above approaches provide various advantages. For example, unlike man in the middle attacks, this approach can inspect a small part of the handshaking that occurs at the setup of the encrypted channel that is sent in the clear. Thus, it can work even when full decryption of the conversation is impossible. Furthermore, inspecting the certificates is cheaper computationally than decrypting the entire conversation.

Attackers have the ability to setup and tear down new servers at new cloud providers very quickly, which can allow them to get around IP and DNS reputation. However, if they are using an encrypted channel for command and control, they will need certificates. The attackers may self-sign them, which this approach can catch via algorithmic analysis, or they may reuse existing ones, which this approach can catch via reputation feeds. Generating new, legitimate certificates that are signed by well-known certificate authorities is likely to be both too slow and too expensive for the malware creator and also can establish an audit trail for law enforcement.

Figures 3, 4:
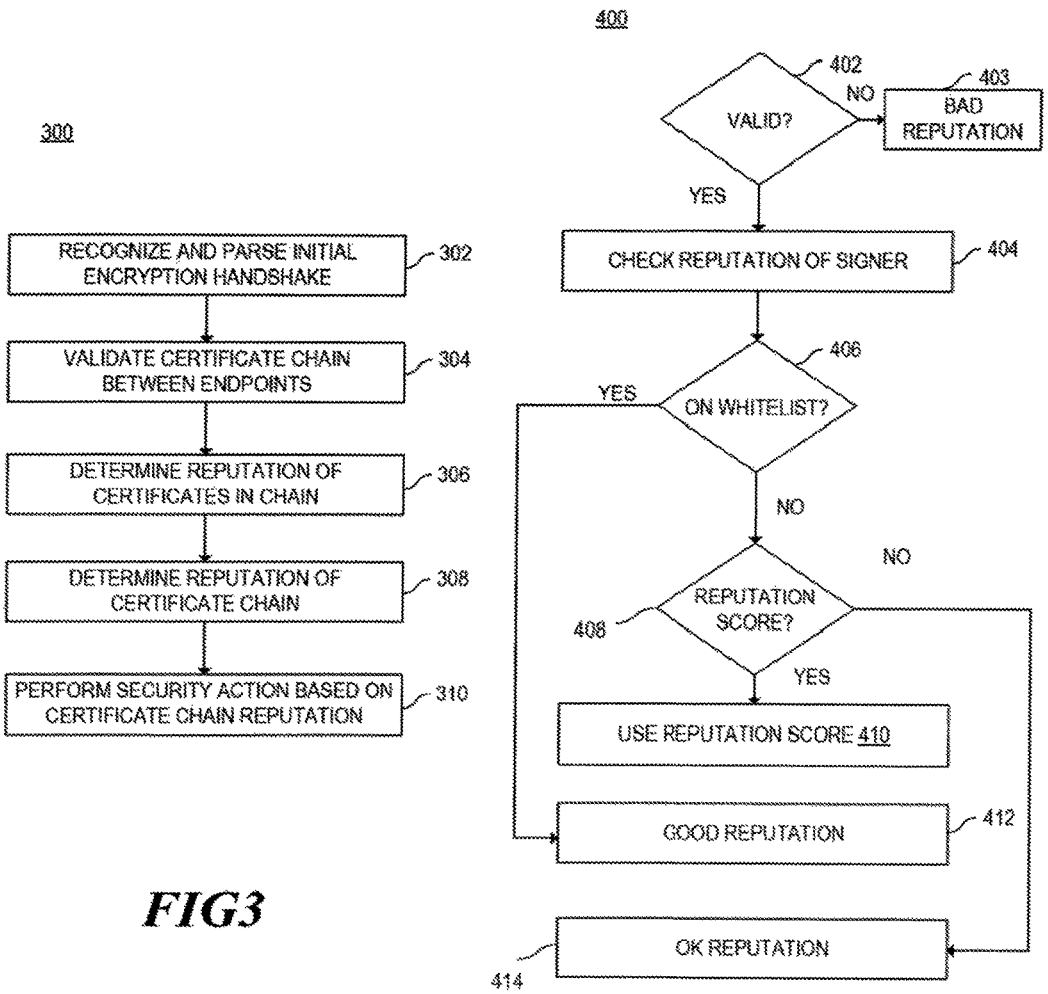
FIG. 3 is a flowchart of a method for performing a security action on encrypted communication based on certificate chain reputation, according to one example.
FIG. 4 is a flowchart of a method for determining a reputation of a certificate of a certificate chain, according to one example.

FIG. 3 is a flowchart of a method for performing a security action on encrypted communication based on certificate chain reputation, according to one example. Although execution of method 300 is described below with reference to network security device 100, other suitable components for execution of method 300 can be utilized (e.g., network security device 500). Additionally, the components for executing the method 300 may be spread among multiple devices. Method 300 may be implemented in the form of executable instructions stored on a machine-readable storage medium, such as storage medium 520, and/or in the form of electronic circuitry.

Method 300 may start at 302, where a recognition engine 110 recognizes and parses an initial handshake used to establish an encrypted channel between two endpoints. A packet inspection engine 116 and/or other resources can continually monitor activity associated with at least one of the endpoints (e.g., the endpoint is within a network environment being protected by the network security device 100). Then, at 304, the validation engine 112 validates a certificate chain between the two endpoints. As noted, the certificate chain can include one certificate or multiple certificates. Each of the certificates can be signed by a signer.

At 306, a reputation engine 114 can determine the reputation of each of the certificates. The reputation can be based on various resources, for example, a reputation feed, a whitelist, an algorithm using a heuristic analysis, a self-signed rule, etc. In certain examples, a self-signed rule is a rule executed by the network security device to determine the reputation of a signer of a self-signed certificate based on an algorithm to indicate whether the certificate is abnormal or carries an indicator that an illegitimate certificate is in use (e.g., based on time, names, etc.). As noted above, in one example, the determination can be based on whether the domain name of the signer is a natural language domain name, the length of time since the certificate was signed, etc. Such a heuristic analysis can be used on other types of certificates.

The reputation engine 114 can determine a reputation of the certificate chain (308). The reputation can be in the form of a single score, in the form of multiple values, or the like. In one example, the reputation is based on an algorithm that represents the reputation of the signers of the certificates in the chain. Further, the algorithm can be customizable to reflect a particular entity's network environment (e.g., focus on not letting malware through vs. focus on making sure good traffic is not filtered as well). In one example, the certificate reputation can include two values, an average value of the reputation of the signers and the value of the worst of the reputations in the chain. At 310, a security action can be performed on based on the certificate reputation. This can be based, for example, on an algorithm using the worst value and the average value. For example, if the worst value is considered more likely to be a threat than a certain threshold, communication on the encrypted channel can be blocked. In another example, if the worst value is better than a particular threshold, the average value is used to determine whether the encrypted channel communications should be blocked. As noted above, other security actions can be performed.

FIG. 4 is a flowchart of a method for determining a reputation of a certificate of a certificate chain, according to one example. Although execution of method 400 is described below with reference to network security device 100, other suitable components for execution of method 400 can be utilized (e.g., network security device 500). Additionally, the components for executing the method 400 may be spread among multiple devices. Method 400 may be implemented in the form of executable instructions stored on a machine-readable storage medium, such as storage medium 520, and/or in the form of electronic circuitry.

At 402, the validation engine 112 can determine the validity of a certificate. Certificates can be determined by parsing packets and following the protocol used by the particular communication. The packets can be parsed before the communication is encrypted, for example, during a handshake phase. If the certificate is determined to be not valid, the reputation associated can be considered bad at 403. In the above example, a bad reputation can be considered to be a reputation of 100. If the certificate is valid, at 404, the reputation engine 114 checks the reputation of the certificate. If the signer is on a whitelist (e.g., via a reputation feed) 406, the reputation can be considered a good reputation at 412. If the signer is not on the whitelist, a reputation score from the feed or another feed can be determined 408. If there is a reputation score associated with the signer, the associated reputation score is assigned at 410. In some examples, the reputation score to be used can be a combination of a base reputation score along with information from the certificate (e.g., a timestamp) and/or based on a heuristic analysis. In this example, either the feed or the network security device can implicate a rule to dynamically change a reputation value provided by the feed.

If there is no associated reputation at 408, then, the reputation is set to an OK score at 414. In certain scenarios, an OK score is a baseline score that is used when there is no information on the signer. In other examples, the reputation score can be further based on a heuristic analysis of the certificate instead of the baseline. The heuristic analysis may also take into consideration the heuristic analysis. Further, in some scenarios, a good reputation score can be considered a baseline for showing that the reputation is not associated with malware (e.g., a 0 score in the 0-100 score example above).

Figure 5:
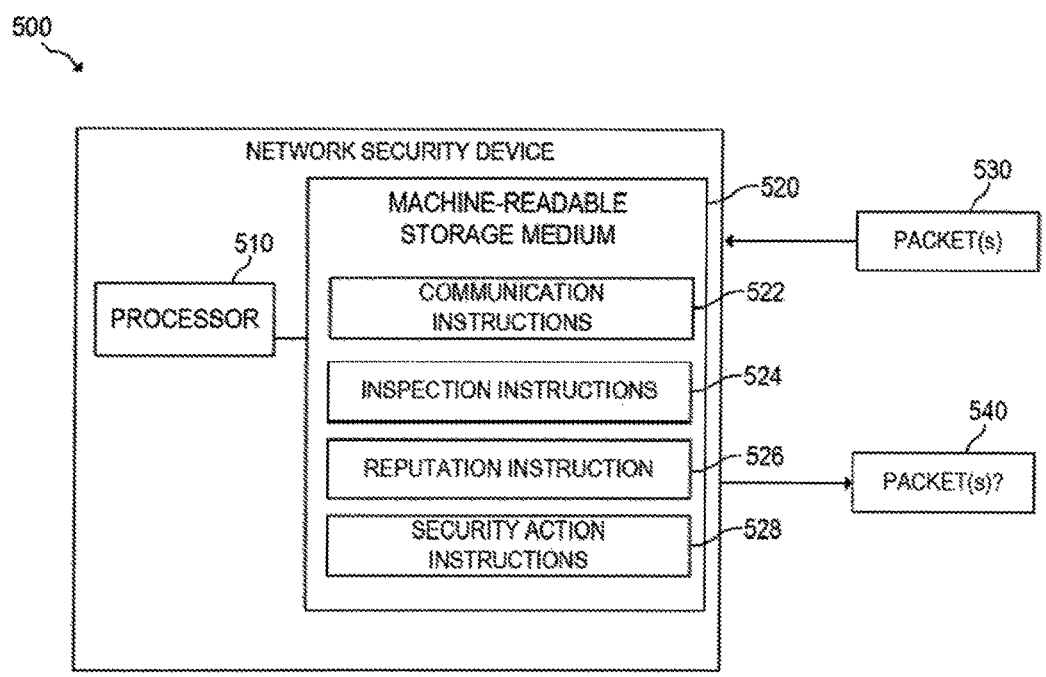
FIG. 5 is a block diagram of a network security device capable of performing a security action based on reputation value of signers of certificates of encrypted traffic, according to one example.

FIG. 5 is a block diagram of a network security device capable of performing a security action based on reputation value of signers of certificates of encrypted traffic, according to one example. The network security device 500 includes, for example, a processor 510, and a machine-readable storage medium 520 including instructions 522, 524, 526, 528 for performing a security action on communication. Network security device 500 may be, for example, an intrusion prevention system, an intrusion detection system, a firewall, a router, or any other computing device capable of performing the functionality herein.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, multiple cores across multiple devices (e.g., if the network security device 500 includes multiple node devices), or combinations thereof. Processor 510 may fetch, decode, and execute instructions 522, 524, 526, 528 to implement the approaches described in methods 300, 400. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526, 528.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for the approaches described herein.

In one example, communication instructions 522 and inspection instructions 524 can be used to monitor communications between two endpoints. This can occur by receiving packets 530 from one endpoint and providing the packets 540 to the other endpoint. It should be understood that the packets can be send directly or indirectly to and from the endpoints. As such, the network security device 500 can recognize and parse an initial communication to establish an encrypted channel between the endpoints. Further, the network security device 500 can validate a certificate chain between the two endpoints. The certificate chain can include one or more certificates. Further, the certificates can be associated with respective signers.

The network security device 500 can execute reputation instructions 526 to determine reputation scores for the certificates. The reputation scores can be determined as described above, for example, as described in method 400. A reputation for the chain can then be determined. In one example, the reputation can include an average reputation value from the respective reputation scores of the signers. Further, the reputation can include a worst value reflecting the reputation score most likely representing malware out of the group.

Security action instructions 528 may be executed by the processor 510 to perform a security action based on the reputation of the chain. As noted above, the security action can be to allow the communication to occur, to block encrypted communication, to send a message explaining the communication to a security analyst, etc.

What is claimed is:

1. A network security device comprising a processor and a machine-readable storage medium, the machine-readable storage medium storing instructions that when executed by the processor cause the network security device to:
    monitor an initial communication between two endpoint devices over a computer network;
    recognize and parse the initial communication used to establish an encrypted channel between the two endpoint devices;
    validate a certificate chain between the two endpoint devices;
    determine a reputation for each of a plurality of certificates in the certificate chain;
    determine a certificate reputation for the certificate chain, the certificate reputation being determined from and representative of reputations of the plurality of certificates; and
    perform a security action to allow or block a communication via the encrypted channel based on the certificate reputation.

2. The network security device of claim 1, wherein the reputations of the plurality of certificates are based on at least one of: a whitelist and a reputation feed.

3. The network security device of claim 2, wherein each of the plurality of certificates is associated with a signer, and wherein if a signer of one certificate of the plurality of certificates is not on the whitelist or the reputation feed, a reputation of the one certificate is set to a predetermined level indicating that the reputation of the one certificate is permissible.

4. The network security device of claim 1, wherein one certificate of the plurality of certificates cannot be validated, and wherein the reputation of the one certificate is set to a predetermined level indicating that the reputation of the one certificate is not permissible.

5. The network security device of claim 1, wherein the instructions stored in the machine-readable storage medium, when executed by the processor, further cause the network security device to:

determine whether one certificate of the plurality of certificates is self-signed by one endpoint device of the two endpoint devices, wherein a signer of the one certificate is the one endpoint device, wherein if the one certificate is self-signed, the network security device is to perform analysis to determine whether the one certificate is at least one of abnormal and carries an indicator that an illegitimate certificate is in use.

6. The network security device of claim 1, wherein the certificate reputation is based on an average value of the reputations of the plurality of certificates and a value of a worst one of the reputations of the plurality of certificates.

7. The network security device of claim 1, wherein a reputation of one certificate of the plurality of certificates is based on a reputation feed and a meta-analysis of the one certificate.

8. A method for using a network security device, the method comprising:

monitoring an initial communication between two endpoint devices over a computer network;

recognizing and parsing the initial communication used to establish an encrypted channel between the two endpoint devices;

validating a certificate chain between the two endpoint devices, wherein the certificate chain includes a plurality of certificates, wherein the plurality of certificates are each associated with a signer;

determining a reputation for each of the plurality of certificates, wherein the reputation of each of the plurality of certificates is based on at least one of: a whitelist, a reputation feed, and a self-signed rule;

determining a certificate reputation for the certificate chain based on the reputations of the plurality of certificates to reflect a trustworthiness of the certificate chain; and performing a security action to allow or block a communication via the encrypted channel based on the certificate reputation.

9. The method of claim 8, wherein the certificate reputation for the certificate chain is based on an average value of the reputations of the plurality of certificates and a value of a worst one of the reputations of the plurality of certificates, and the security action is based on a rule using the average value and the worst value.

10. The method of claim 8, further comprising:

determining whether the certificate chain is self-signed by one of the two endpoint devices because a signer of one of the plurality of certificates is the one of the two endpoint devices, determining that a domain of the signer is not a natural language domain, wherein the reputation of the signer is set to a predetermined level indicating that the reputation of the signer is not permissible; and wherein the security action is to block the communication via the encrypted channel.

11. A non-transitory machine-readable storage medium storing instructions that, when executed by at least one processor of a network security device, cause the network security device to:

monitor an initial communication between two endpoint devices over a computer network;

parse the initial communication to establish an encrypted channel between the two endpoint devices;

validate a certificate chain between the two endpoint devices, wherein the certificate chain includes a plurality of certificates, and wherein each of the plurality certificates is associated with a signer;

determine a reputation score for each of the plurality of certificates;

determine an average reputation value of reputation scores of the plurality of certificates and determine a worst value reflecting a worst one of the reputation scores of the plurality of certificates; and perform a security action to allow or block a communication via the encrypted channel based on the determined average reputation value and the worst value.

12. The non-transitory machine-readable storage medium of claim 11, wherein a reputation score of one certificate of the plurality of certificates is based, at least in part on a reputation feed and a meta-analysis of the one certificate.

13. The non-transitory machine-readable storage medium of claim 11, wherein one of the plurality of certificates cannot be validated, and wherein a reputation score of the one certificate is set to a predetermined level indicating that the reputation score of the one certificate is not permissible.

14. The non-transitory machine-readable storage medium of claim 11, wherein the reputation scores of the plurality of certificates are based on at least one of: a whitelist and a reputation feed associated with the respective signer, and wherein if a signer of a one certificate of the plurality of certificates is not on the whitelist or the reputation feed, a reputation score of the one certificate is set to a predetermined level indicating that the reputation score of the one certificate is permissible.

* * * * *